US008386429B2

(12) United States Patent
Manis et al.

(10) Patent No.: US 8,386,429 B2
(45) Date of Patent: Feb. 26, 2013

(54) GENERIC EDITOR FOR DATABASES

(75) Inventors: William A. Manis, Sammamish, WA (US); Lonny Bastien, Bellevue, WA (US); Antony Scott Williams, Mercer Island, WA (US); Anthony Christopher Bloesch, Vashon, WA (US); Gunter Leeb, Redmond, WA (US); Haroon Ahmed, Bellevue, WA (US); Randy S. Kimmerly, Woodinville, WA (US); Arye Gittelman, Mercer Island, MA (US); Donald F. Box, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 467 days.

(21) Appl. No.: 12/416,009

(22) Filed: Mar. 31, 2009

(65) Prior Publication Data

US 2010/0250623 A1  Sep. 30, 2010

(51) Int. Cl.
*G06F 7/00* (2006.01)
(52) U.S. Cl. .................. 707/640; 707/641; 707/653
(58) Field of Classification Search .................. None
See application file for complete search history.

(56) References Cited

U.S. PATENT DOCUMENTS

| | | | |
|---|---|---|---|
| 5,926,823 A | 7/1999 | Okumura | |
| 5,983,234 A | 11/1999 | Tietjen | |
| 6,745,209 B2 * | 6/2004 | Holenstein et al. | 707/615 |
| 6,782,085 B1 * | 8/2004 | Becker et al. | 379/126 |
| 6,976,029 B2 * | 12/2005 | Venkatesh et al. | 1/1 |
| 7,143,112 B2 * | 11/2006 | Yagawa | 1/1 |
| 7,296,037 B1 | 11/2007 | Kruy | |
| 7,580,970 B2 * | 8/2009 | Bank et al. | 707/641 |
| 7,676,492 B2 * | 3/2010 | Bodily et al. | 707/640 |
| 7,707,177 B2 * | 4/2010 | Bank et al. | 707/653 |
| 7,822,825 B2 * | 10/2010 | De Luca et al. | 709/217 |
| 7,826,842 B2 * | 11/2010 | Buckley et al. | 455/435.2 |
| 7,881,959 B2 * | 2/2011 | Ramsey et al. | 707/641 |
| 7,917,495 B1 * | 3/2011 | Chapman et al. | 707/653 |
| 2004/0128165 A1 * | 7/2004 | Block et al. | 705/2 |
| 2005/0015400 A1 * | 1/2005 | Yoneda et al. | 707/102 |
| 2005/0102314 A1 * | 5/2005 | Howard et al. | 707/640 |
| 2008/0270983 A1 | 10/2008 | Ahadian | |
| 2009/0061807 A1 * | 3/2009 | Zigler et al. | 455/303 |
| 2009/0132554 A1 * | 5/2009 | Nagoya | 707/100 |
| 2009/0178116 A1 * | 7/2009 | Nagoya et al. | 726/3 |
| 2009/0319588 A1 * | 12/2009 | Gandhi et al. | 707/640 |

(Continued)

OTHER PUBLICATIONS

Mikhail Zhizhin, Environmental Scenario Search and Visualization, 2007, ACM, 10 pages, <URL: http://delivery.acm.org/10.1145/1350000/1341047/a27-zhizhin.pdf>.*

(Continued)

*Primary Examiner* — Thuy Dao
*Assistant Examiner* — Hua Lu
(74) *Attorney, Agent, or Firm* — Workman Nydegger

(57) ABSTRACT

Facilitating generic database editing to allow for data to be received from a user for entry into a database without requiring the data to conform to schema constraints for the database. A method includes examining a first schema for a first database. The first schema including a first set of constraints specified in the first schema on data to be entered into the first database. The method further includes, based on the examination, constructing a second database corresponding to the first database. The second database is associated with a second schema with a second set of constraints. The second set of constraints is a relaxed version of the first set of constraints specified in the first schema.

19 Claims, 2 Drawing Sheets

U.S. PATENT DOCUMENTS

2010/0027889 A1* 2/2010 Zhang et al. ............... 382/186
2010/0107261 A1* 4/2010 Nagoya et al. ............... 726/30
2010/0138382 A1* 6/2010 Nagoya et al. ............... 707/609

OTHER PUBLICATIONS

Thomas Cheatham, Process Programming and Process Models, 1990, ACM, 3 pages, <URL: http://delivery.acm.org/10.1145/320000/317696/p49-cheatham.pdf>.*

Jianzhong Li, InfiniteDB: a PC-Cluster based Parallel Massive Database Management System, 2007, ACM, 11 pages, <URL: http://delivery.acm.org/10.1145/1250000/1247585/p899-Ii.pdf>.*

Jim Smith, Polar: An Architecture for a Parallel ODMG Compliant Object Database, 2000, ACM, 8 pages, <URL: http://delivery.acm.org/10.1145/360000/354840/p352-smith.pdf>.*

Carol Lundquist, A Parallel Relational Database Management System Approach to Relevance Feedback in Information Retrieval, 2009, Google Scholar, 28 pages, <URL: http://mail.ir.iit.edu/~dagr/1999aparallelrelational.pdf>.*

K Ronald Sujithan, Collection Types for Database Programming in the BSP Model, 1997, Google Scholar, 10 pages, <URL: http://reference.kfupm.edu.sa/content/c/o/collection_types_for_database_programmin_1529649.pdf>.*

Sage Software; "Database Editor"; 2006; pp. 1-2; http://www.enabling.net/download/brochures/sage/timberline/office/database_editor.pdf (Copy Attached).

Pohlmann, Charl; "SQL Database Editor"; Aug. 25, 2004; pp. 1-8; http://www.codeproject.com/KB/database/SQLEditor.aspx (Copy Attached).

Oraspeed; "Oraspeed SQL Editor"; Aug. 30, 2007; pp. 1-2; http://oraspeed-sql-editor.lastdownload.com/ (Copy Attached).

MSDN; "Integration Services User Interface"; Jan. 2009; pp. 1-3; http://msdn.nnicrosoft.com/en-us/library/ms141730.aspx (Copy Attached).

Wikipedia; "Toolkit for Conceptual Modeling"; Nov. 17, 2008; p. 1; http://en.wikipedia.org/wiki/Toolkit_for_Conceptual_Modeling (Copy Attached).

Villanova; "Content Management System"; 2005; pp. 1-4; http://villanova.edu/unit/assets/documents/web/ws_content_management_system.pdf (Copy Attached).

Severance, Dennis G.; "Differential Files: Their Application to the Maintenance of Large Databases"; Sep. 1976 pp. 256-267; http://portal.acm.org/citation.cfm?doid=320473.320484 (Copy Attached).

* cited by examiner

GENERIC EDITOR FOR DATABASES

BACKGROUND

Background and Relevant Art

Computers and computing systems have affected nearly every aspect of modern living. Computers are generally involved in work, recreation, healthcare, transportation, entertainment, household management, etc.

Computing systems can include databases for storing, organizing and linking data. Data is often stored in database according to a tightly controlled schema which includes constraints on how data is to be organized in the database. Data can be edited in the database or entered into the database if the constraints are strictly followed. However, if the constraints are not followed, the database will typically not allow the data to be entered. For example, a schema may specify that entries into a particular column or field be of a certain type, say for example, an integer type. If a user attempts to input an entry that is not of the integer type into such a field, the database will reject the entry and not allow the user to enter the data into the database.

Databases may have other constraints as well. For example, a database may have a schema with a constraint that indicates that if certain entries are made, other entries must be made as well for the certain entries to be committed to the database. For example, a database may have a constraint that indicates that if a name is entered into a name field, corresponding address and telephone numbers must be entered as well for the name to be committed (and finally entered into) the database. If a user attempts to enter a name, or group of names, into a database but does not have immediate ready access to either the address or telephone number, the name entries may be lost and need to be reentered once the user has access to the address and/or telephone information.

Additionally, a user may be able to enter data directly into an editing interface directly associated with the database, but may have difficulty using generic data editors to enter data into a database. In particular, the generic editor may not be aware of schema constraints, and thus cannot direct a user to make appropriate entries. In particular, the generic editor may not be aware of triggers, stored procedures, checks, concurrency requirements, etc. or may not be able to provide sufficient context in that the generic editor does not have access to data for foreign key, unique key, and primary key information.

The subject matter claimed herein is not limited to embodiments that solve any disadvantages or that operate only in environments such as those described above. Rather, this background is only provided to illustrate one exemplary technology area where some embodiments described herein may be practiced.

BRIEF SUMMARY

One embodiment described herein includes a method that may be practiced in a computing environment. The method includes acts for facilitating generic database editing to allow for data to be received from a user for entry into a database without requiring the data to conform to schema constraints for the database. The method includes examining a first schema for a first database. The first schema including a first set of constraints specified in the first schema on data to be entered into the first database. The method further includes, based on the examination, constructing a second database corresponding to the first database. The second database is associated with a second schema with a second set of constraints. The second set of constraints is a relaxed version of the first set of constraints specified in the first schema.

Another embodiment includes a method that may be practiced in a computing environment. The method includes acts for facilitating generic database editing to allow for data to be received from a user for a first database without requiring the data to conform to a first schema for a first database. The first schema includes a first set of constraints on data to be entered into the first database. Method steps may be performed at a second database corresponding to the first database. The second database is associated with a second schema with a second set of constraints. The second set of constraints are a relaxed version of the first set of constraints specified in the first schema. The method includes receiving user input for the second database. The user input includes data complying with the second schema. The method further include storing the user input in the second database separate from the first database.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Additional features and advantages will be set forth in the description which follows, and in part will be obvious from the description, or may be learned by the practice of the teachings herein. Features and advantages of the invention may be realized and obtained by means of the instruments and combinations particularly pointed out in the appended claims. Features of the present invention will become more fully apparent from the following description and appended claims, or may be learned by the practice of the invention as set forth hereinafter.

BRIEF DESCRIPTION OF THE DRAWINGS

In order to describe the manner in which the above-recited and other advantages and features can be obtained, a more particular description of the subject matter briefly described above will be rendered by reference to specific embodiments which are illustrated in the appended drawings. Understanding that these drawings depict only typical embodiments and are not therefore to be considered to be limiting in scope, embodiments will be described and explained with additional specificity and detail through the use of the accompanying drawings in which.

DETAILED DESCRIPTION

Some embodiments described herein are directed to storing database entries for a first database in a parallel database. The parallel database is associated with a parallel schema with constraints that are not as strict as constraints in a schema for the first database. For example, even though the first database has a row or field with constraints in a schema that requires entries in that row or field to be of type integer, the second database may include a schema with no type constraints in a corresponding row or field. In some embodiments, this may allow a user to edit data for entry into the first database without being constrained by the stricter requirements of the first database. In some embodiments, this allows a user to enter what data they have available and to persist such information until the information can be made to comply with the stricter requirements of the first database. In other embodiments, this allows for generic data editors to be used to enter information for the first database.

Embodiments may also be implemented which allow for a user to enter the data for the first database into the parallel database without conforming strictly to constraints for the first database, but yet the embodiments provide warnings or messages to a user indicating that the data does not comply with constraints for the first database. This allows a user to take corrective actions before trying to merge the data from the parallel database into the first database. Embodiments may be able to accomplish this functionality by examining the schema for the first database such that a system can determine if entries into the parallel database comply with constraints from a schema for the first database.

Additionally or alternatively, embodiments may include functionality for surfacing warnings from the first database to a user. For example, if an attempt is made to merge data from the parallel database into the first database, and the merge is not able to be completed due to the first database throwing an exception, information about the exception can be surfaced to a user. Illustrating a number of specific examples, errors may be raised by the first database as a result of actuation of triggers, a check, or a concurrency violation. Additionally or alternatively, when errors are raised, these may be logged to allow a developer to develop embodiments that can alert a user entering data into the parallel database without needing to attempt to merge data from the parallel database into the first database. In particular, a developer may not be able to ascertain some database requirements simply by examining constraints in the schema for the first database, as those requirements are only manifest as the result of a trigger in the database being actuated, a check predicate not being satisfied, data not being able to be committed due to concurrency violations, etc.

Figure 1:
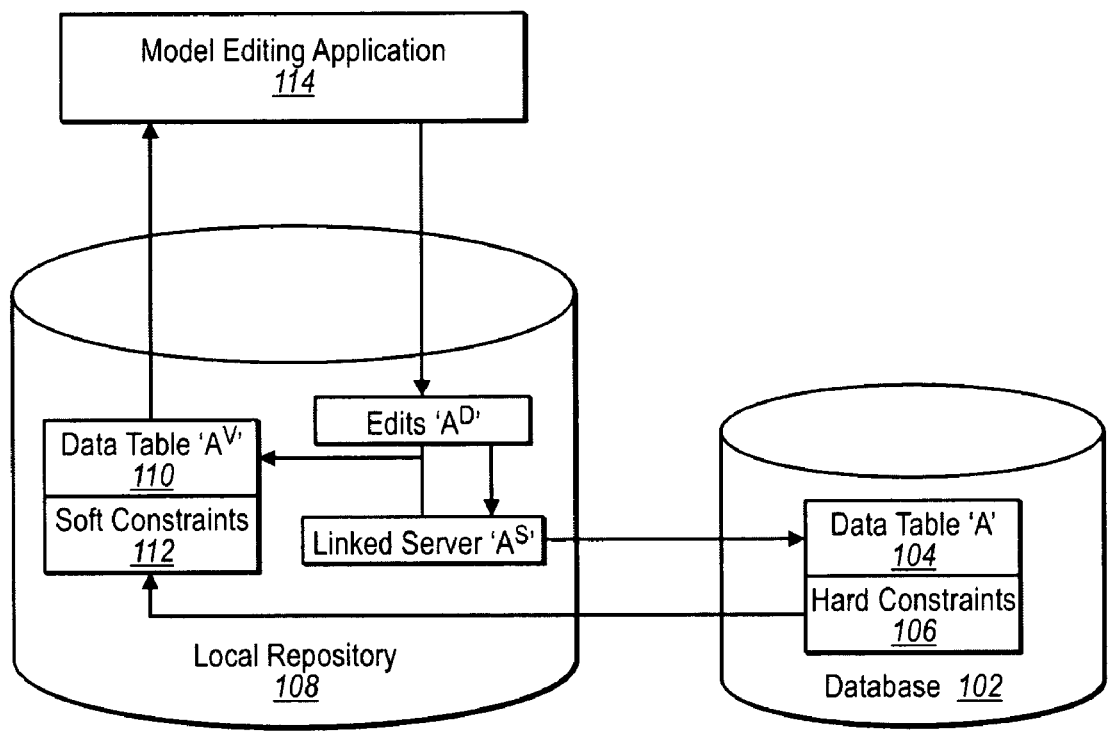
FIG. 1 illustrates a computing environment including a first database and a parallel database to the first database.

Referring now to FIG. 1, an example embodiment is illustrated. FIG. 1 illustrates a first database 102. The first database 102 includes a data table 104. Associated with the data table 104 is a schema which includes a set of constraints 106. The constraints 106 specify restrictions on data that can be entered into the data table 104 and the database 102. For example, the constraints may indicate that entries into a particular column or field of the table 104 be of a certain type, say for example, an integer type. If a user attempts to input an entry that is not of the integer type into such a field, the database will reject the entry and not allow the user to enter the data into the database 102. In another example, the database 102 may have a schema with a constraint that indicates that if certain entries are made, other entries must be made as well for the certain entries to be committed to the database 102. For example, a database may have a constraint that indicates that if a name is entered into a name field, corresponding address and telephone numbers must be entered as well for the name to be committed (and finally entered into) the database.

FIG. 1 further illustrates a parallel database 108 which acts as a local repository for data that can later be entered into the database 102. The parallel database 108 includes a data table 110. The data table 110 has columns rows and/or fields that correspond to columns rows and/or fields in the data table 104. However, the data table 110 is associated with a schema with a set of constraints 112 that are not as restrictive as the set of constraints 106. Thus, data that may not normally be able to be entered into the data table 104 can be entered into the parallel data table 110. Problems with the data in the data table 110 can later be resolved so that the data can then be entered into the data table 104.

FIG. 1 further illustrates a data editor application 114. The data editor application 114 may be, for example, a generic editor that does not necessarily understand constraints or other requirements for data being entered into the database 102.

The following discussion now refers to a number of methods and method acts that may be performed. It should be noted, that although the method acts may be discussed in a certain order or illustrated in a flow chart as occurring in a particular order, no particular ordering is necessarily required unless specifically stated, or required because an act is dependent on another act being completed prior to the act being performed.

Figure 2:
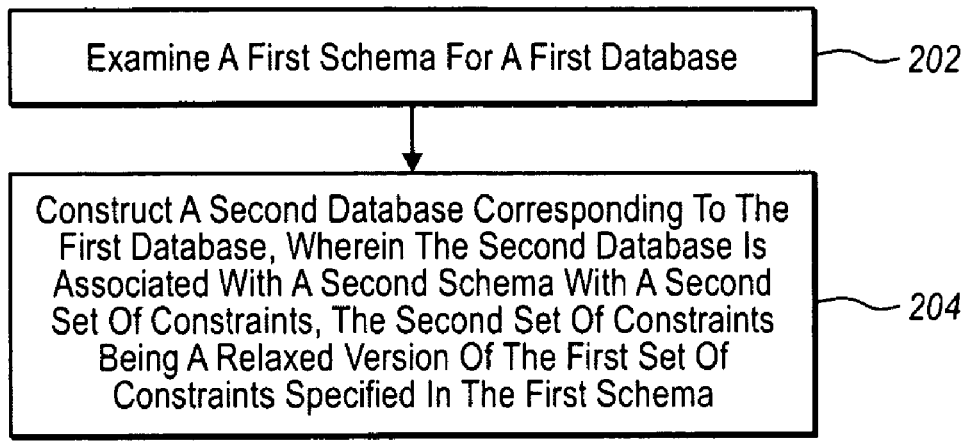
FIG. 2 illustrates a method of facilitating generic database editing.

Referring now to FIG. 2, a method 200 is illustrated. The method 200 may be practiced in a computing environment. The method 200 includes acts for facilitating generic database editing to allow for data to be received from a user for entry into a database without requiring the data to conform to schema constraints for the database. The method 200 includes examining a first schema for a first database (act 202). The first schema may include a first set of constraints specified in the first schema on data to be entered into the first database. For example, FIG. 1 illustrates constraints 106 on data entered into the database 102. By examining the schema that includes the constraints, a user can determine constraints, or fields for a second database.

The method 200 further includes constructing a second database corresponding to the first database (act 204). The second database is associated with a second schema with a second set of constraints. The second set of constraints is a relaxed version of the first set of constraints specified in the first schema. Constructing a second database may include constructing the database in main memory and/or in one or more computer readable storage media of a computing system. The computing system may include appropriate processing hardware for interacting with the computer readable storage media. In one example, processing hardware may include functionality for reading from and writing to the database. FIG. 1 illustrates an example of a parallel database 108 which is one example of the second database. FIG. 1 further illustrates constraints 112 which may be part of a schema with relaxed constraints. In particular, the constraints 112 may be relaxed constraints for the second schema.

Illustratively, in one embodiment, the first set of constraints may include a constraint that restricts field entries in a field in the first database to a limited set of one or more types. In contrast, the second set of constraints for the second database includes a corresponding constraint that allows corresponding field entries in a corresponding field in the second database to be of a type not included in the limited set of one or more types. For example, constraints for the first database may limit entries in fields to integer type objects. In contrast, constraints for corresponding fields in the second database my allow integers, floating points, strings, or other data types to be entered.

Illustrating another example, the first set of constraints may include a constraint that restricts field entries in a field in the first database to be unique or primary keys. A unique key is a given entry in a column in which no other entries in the column are identical to the given entry. Similarly, a primary key is a given entry in a column in which no other entries in the column are identical to the given entry and where no entries in the column can be null. Embodiments may be implemented where the second set of constraints includes a corresponding constraint that allows corresponding field entries in a corresponding field (i.e. the corresponding field in the second database corresponds to a field in the first database) in the second database to be entries that are not unique or valid primary keys.

In one embodiment, the first set of constraints may include a constraint that restricts field entries in a field in the first database to a limited set of foreign keys. The second set of constraints includes a corresponding constraint that allows corresponding field entries in a corresponding field in the second database to not be limited to a limited set of foreign keys.

The second database may be associated with a set of one or more computer implemented modules configured to receive data from a user, determine that the data received from the user complies with the constraints in the second schema, in response to determining that the data received from the user complies with the second set of constraints in the second schema, store the data received from the user in the second database, in spite of the data received from the user being stored in the second database, determine that the data received from the user does not comply with the first set of constraints for the first schema for the first database; and in response to determining that the data received from the user does not comply with the first set of constraints for the first schema for the first database, surface to the user that the data does not comply with the first set of constraints for the first schema for the first data base. For example in some embodiments, the second database may be associated with computer modules that are able to determine that even though data may comply with the constraints for the second database, the data would not comply with constraints for the first database. Considering that the ultimate goal may be to enter data from the second database into the first database, it may be useful to assist a user in making data compliant with the constraints on data for the first database. In one embodiment, when the second database is associated with computer modules that can evaluate data to the constraints for the first database, the computer modules may also send a message to a user indicating that the data does not comply with the constraints for the first database and/or that the information on why the data does not comply with the constraints for the first database.

As noted, it may ultimately be an objective to merge the data in second database into the first database. Thus, in some embodiments, the second database may be associated with a set of one or more modules configured to attempt to merge data from the second database into the first database. For example, these modules may be able to invoke database commands on the first database to move entries from the second database to the first database. However, in some situations, data may not be able to be merged from the second database to the first database. Thus, in some embodiments, the second database is associated with computer modules configured to receive a notification from the first database that the data from the second database cannot be merged into the first database including information about why the data from the second database cannot be merged into the first database and surface information about why data from the second database cannot be merged into the first database. The second database may continue to store the data in the second database in the second database to allow the user an opportunity to correct defects in the data in the second database that prevent the data in the second database from being merged into the first database.

Data may not be able to be merged for any one of a number of different reasons. For example, data from the second database may not be able to be merged into the first database for at least one of data in the second database not complying with a predicate of a check for the first database, data being rejected as a result of a executing program scripts like triggers in the first database based on data from the second database, or data being rejected as a result of a concurrency exception in the first database when an attempt is made to enter data from the second database into the first database.

Fields of a database may often be associated with one or more checks to determine valid data that may be entered into the fields. These checks are not typically reflected in the constraints of the schema of the database. Rather, the database includes programmatic modules configured to evaluate one or more predicates of a check, and if the predicates are satisfied when an attempt to enter data into the database is made, then the data can be entered. Otherwise, an error is raised and the data is not allowed to be entered. Because often the predicates for the checks cannot be determined from the schema, in some embodiments, the second database and programmatic code associated with it may not be aware of these checks until an attempt to merge data from the second database into the first database is made. Thus, embodiments may include functionality for surfacing errors and/or related messages due to not meeting the requirements of a check predicate to a user of the second database so that the user can correct any problems with the data.

Similarly, databases may include programmatic code with trigger functionality. For example, data being entered into a database my trigger actions by the database, which may invalidate other database entries or add additional requirements for certain fields in the database. Again, typically the results of these triggers is not able to be ascertained by examining the schema, such that in the present examples, the second database and associated computing modules may not be aware of trigger results until an attempt is made to merge data from the second database into the first database. Thus, embodiments may include functionality for surfacing errors to a user of the second database for errors caused by triggers in the first database.

Concurrency violations may also be detected in a database. Concurrency errors are typically raised when an attempt is made to commit data to a database where the data is out of date or other dependencies have not been met. For example some entries into some fields may only be valid so long as no changes have been made to some particular other fields. Again, these requirements can typically not be ascertained by examination of the schema. Thus, embodiments may include functionality for surfacing errors to a user of the second database for violations caused by concurrency in the first database.

However, embodiments may include adaptive features that allow a database developer of the second database to later include programmatic code to alert a user of the second database to check, trigger and concurrency requirements without the need to attempt to merge the data from the second database into the first database once such requirements are know, for example once learned by previous attempts to merge data. For example, the second database may be associated with a set of one or more modules configured to store information on one or more computer readable media about why data from the second database cannot be merged into the first database so as to allow a developer to modify characteristics or constraints of the second database.

Figure 3:
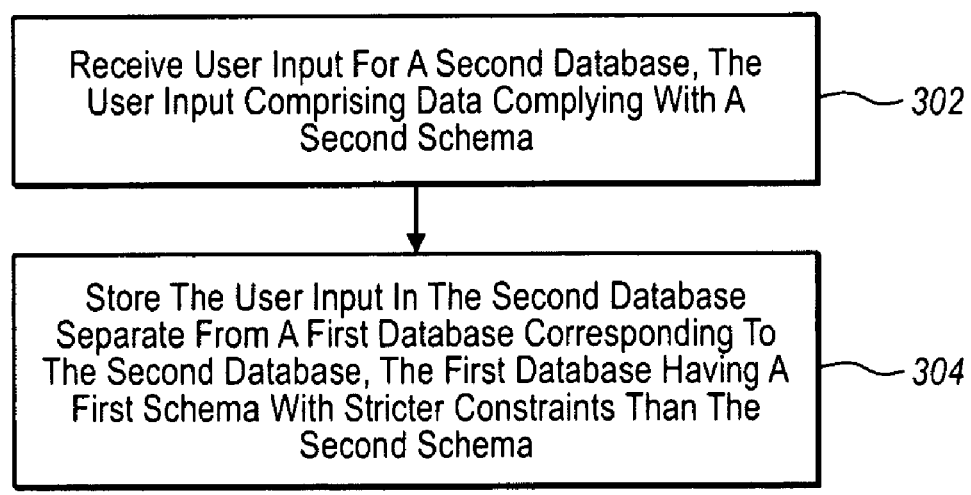
FIG. 3 illustrates another method of generic database editing.

Referring now to FIG. 3, another method 300 is illustrated. The method 300 may be practiced in a computing environment and include acts for facilitating generic database editing to allow for data to be received from a user for a first database without requiring the data to conform to a first schema for a first database. The first schema includes a first set of constraints on data to be entered into the first database. In this example, the acts of the method 300 are performed at a second database corresponding to the first database. The second database is associated with a second schema which has a second set of constraints. The second set of constraints is a relaxed version of the first set of constraints specified in the first schema. For example, as illustrated in FIG. 1, the constraints 112 may be a relaxed version of the constraints 106. In one specific example, a constraint in the first set of constraints may limit entries into fields to integer type, while a corresponding constraint in the second set of constraints may allow for integers, floating points, strings, and/or other data types.

The method 300 includes receiving user input for the second database, the user input comprising data complying with the second schema (act 302). For example, and with reference to FIG. 1, data may be received that complies with the constraints 112. The method 300 further includes storing the user input in the second database separate from the first database (act 304). For example, parallel corresponding data for the first database is stored separate from the first database in the second database. In some embodiments, this allows for a parallel version of data that may not comply with requirements for the first database, but can nonetheless be stored and edited and in some embodiments corrected so that it can later be merged into the first database.

In some embodiments of the method 300, the method 300 may further include importing data from the first database, storing the data from the first database in fields in the second database corresponding to fields in the first database, and storing the user input with the data from the first database in the second database. For example, if there is a need or desire to maintain a database that is fairly true to the first database, then existing data in the first database can be imported into the second database. Data in the second database can then be added or edited in light of the existing data from the first database. Additionally, in some embodiments, this allows for known check requirements, triggers, and concurrency requirements from the first database to be complied with in the second database.

In an alternative embodiment, the method of claim 300 may include only storing data in the second database that is intended to replace data in the first database or that is new data not yet included in the first database. For example, only data in fields in the second database that is different in value or format from data in corresponding fields in the second database, or data that is entered by a user in the second database but that has not yet been merged into the first database is stored in the second database.

The method 300 may further include determining that the user input received for the second database does not comply with the first set of constraints for the first schema for the first database, and in response to determining that the user input for the second database does not comply with the first set of constraints for the first schema for the first database, surfacing to the user that the user input for the second database does not comply with the first set of constraints for the first schema for the first data base. For example, the second database may be aware of schema constraints for the first database, and while allowing data to be entered into the second database that does not comply with those constraints, the second database may nonetheless surface information indicating that data entered into the second database does not comply with schema constraints for the first database.

In another embodiment of the method 300, the method 300 may further include attempting to merge data from second database into the first database, receiving indication from the first database that the data from the second database cannot be merged into the first database, and surfacing a message to the user that the data from the second database cannot be merged into the first database.

As noted, the inability for data to be merged may be caused by one or more of a number of different conditions. For example, in one embodiment, the indication from the first database that the data from the second database cannot be merged into the first database may be a result of data from the second database not complying with a check predicate specified by constraints in the first schema for the first database. In another embodiment, the indication from the first database that the data from the second database cannot be merged into the first database is a result of a trigger executing in the first database based on data from the second database. In yet another alternative, the indication from the first database that the data from the second database cannot be merged into the first database is a result of a concurrency violations in the first database when an attempt is made to enter data from the second database into the first database.

Embodiments of the present invention may comprise or utilize a special purpose or general-purpose computer including computer hardware, as discussed in greater detail below. Embodiments within the scope of the present invention also include physical and other computer-readable media for carrying or storing computer-executable instructions and/or data structures. Such computer-readable media can be any available media that can be accessed by a general purpose or special purpose computer system. Computer-readable media that store computer-executable instructions are physical storage media. Computer-readable media that carry computer-executable instructions are transmission media. Thus, by way of example, and not limitation, embodiments of the invention can comprise at least two distinctly different kinds of computer-readable media: physical storage media and transmission media.

Physical storage media includes RAM, ROM, EEPROM, CD-ROM or other optical disk storage, magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry or desired program code means in the form of computer-executable instructions or data structures and which can be accessed by a general purpose or special purpose computer. Combinations of the above should also be included within the scope of computer-readable media.

Further, upon reaching various computer system components, program code means in the form of computer-executable instructions or data structures can be transferred automatically from transmission media to physical storage media (or vice versa). For example, computer-executable instructions or data structures received over a network or data link can be buffered in RAM within a network interface module (e.g., a "NIC"), and then eventually transferred to computer system RAM and/or to less volatile physical storage media at a computer system. Thus, it should be understood that physical storage media can be included in computer system components that also (or even primarily) utilize transmission media.

Computer-executable instructions comprise, for example, instructions and data which cause a general purpose computer, special purpose computer, or special purpose processing device to perform a certain function or group of functions. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the invention may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, pagers, routers, switches, and the like. The invention may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. In a computing environment, a method of facilitating generic database editing to allow for data to be received from a user for entry into a database without requiring the data to conform to schema constraints for the database, the schema including a set of constraints on data to be entered into the database, the method comprising:

examining a first schema for a first database, the first database comprising one or more database tables, columns, rows and a first set of fields, the first schema including a first set of constraints specified in the first schema on data to be entered into the first database, wherein at least some of the constraints are specified for a particular table, column or row and wherein the first set of constraints specified in the first schema requires that a first field of the first database can only accept a data value which is one of a particular set of data types; and constructing a second database corresponding to the first database, the second database being parallel to the first database and comprising a second set of fields such that each field in the first set of fields has a corresponding field in the second set of fields, wherein the second database is associated with a second schema with a second set of constraints, the second set of constraints includes zero or more constraints on a first database table column or row in the second database that are less strict than a constraint from the first set of constraints on a database column or row in the first database to which the first database table column or row corresponds and wherein the second set of constraints allows a second field of the second database corresponding to the first field of the first database to accept a data value of a data type which is not among the particular set of data types required by the field of the first of the first database and allows the second field of the second database corresponding to the first field of the first database to accept a data value of a data type which is among the particular set of data types required by the field of the first database.

2. The method of claim 1, wherein the second database further is associated with a set of one or more modules configured to:

receive data from a user;

determine that the data received from the user complies with the constraints in the second schema;

in response to determining that the data received from the user complies with the second set of constraints in the second schema, store the data received from the user in the second database;

in spite of the data received from the user being stored in the second database, determine that the data received from the user does not comply with the first set of constraints for the first schema for the first database; and in response to determining that the data received from the user does not comply with the first set of constraints for the first schema for the first database, surfacing to the user that the data does not comply with the first set of constraints for the first schema for the first data base.

3. The method of claim 1, wherein the first set of constraints includes a constraint that restricts field entries in a field in the first database to be unique or primary keys and the second set of constraints includes a corresponding constraint that allows corresponding field entries in a corresponding field in the second database to be entries that are not unique or valid primary keys, and wherein when data from the second database is merged into the first database, non conformant fields entries reports constraints violation and are not merged into the first database.

4. The method of claim 1, wherein the first set of constraints includes a constraint that restricts field entries in a field in the first database to a limited set of foreign keys and the second set of constraints includes a corresponding constraint that allows corresponding field entries in a corresponding field in the second database to not be limited to a limited set of foreign keys.

5. The method of claim 1, wherein the second database is further associated with a set of one or more modules configured to:

attempt to merge data from the second database into the first database;

receive a notification from the first database that the data from the second database cannot be merged into the first database including information about why the data from the second database cannot be merged into the first database;

surface information about why data from the second database cannot be merged into the first database; and continue to store the data in the second database in the second database to allow the user an opportunity to correct defects in the data in the second database that prevent the data in the second database from being merged into the first database.

6. The method of claim 5, wherein data from the second database cannot be merged into the first database for at least one of data in the second database not complying with a predicate of a check for the first database; data being rejected as a result of a trigger executing in the first database based on data from the second database; or data being rejected as a result of a concurrency exception in the first database when an attempt is made to enter data from the second database into the first database.

7. The method of claim 5, wherein the second database is further associated with a set of one or more modules configured to store information about why data from the second database cannot be merged into the first database so as to allow a user to modify characteristics or constraints of the second database.

8. In a computing environment, a method of facilitating generic database editing to allow for data to be received from a user for a first database without requiring the data to conform to a first schema for a first database, the first schema including a first set of constraints on data to be entered into the first database, the method comprising:

at a second database corresponding to the first database, the second database being parallel to the first database and comprising a second set of fields such that each field in the first database has a corresponding field in the second database, wherein the second database is associated with a second schema with a second set of constraints, the second set of constraints includes zero or more constraints on a first database table column or row in the second database that are less strict than a constraint from the first set of constraints on a database column or row in the first database to which the first database table column or row corresponds and wherein the second set of constraints allows a second field of the second database corresponding to the first field of the first database to accept a data value of a data type which is not among the particular set of data types required by the field of the first database and allows the second field of the second database corresponding to the first field of the first database to accept a data value of a data type which is among the particular set of data types required by the field of the first database:

receiving user input for the second database, the user input comprising data complying with the second schema but not complying with the first schema for the first database;

and storing the user input in the second database separate from the first database.

9. The method of claim 8 further comprising:
importing data from the first database;
storing the data from the first database in fields in the second database corresponding to fields in the first database; and
storing the user input with the data from the first database in the second database.

10. The method of claim 8 further comprising only storing data in the second database that is intended to replace data in the first database or that is new data not yet included in the first database.

11. The method of claim 8 further comprising:
determining that the user input received for the second database does not comply with the first set of constraints for the first schema for the first database; and
in response to determining that the user input for the second database does not comply with the first set of constraints for the first schema for the first database, surfacing to the user that the user input for the second database does not comply with the first set of constraints for the first schema for the first data base.

12. The method of claim 8 further comprising:
attempting to merge data from second database into the first database;
receiving indication from the first database that the data from the second database cannot be merged into the first database; and surfacing a message to the user that the data from the second database cannot be merged into the first database.

13. The method of claim 12, wherein the indication from the first database that the data from the second database cannot be merged into the first database is a result of data from the second database not complying with a check predicate specified by constraints in the first schema for the first database.

14. The method of claim 12, wherein the indication from the first database that the data from the second database cannot be merged into the first database is a result of a trigger executing in the first database based on data from the second database.

15. The method of claim 12, wherein the indication from the first database that the data from the second database cannot be merged into the first database is a result of a concurrency violations in the first database when an attempt is made to enter data from the second database into the first database.

16. In a computing environment, a system with functionality for facilitating generic database editing to allow for data to be received from a user for a database without requiring the data to conform to a schema for the database, the schema including a set of constraints on data to be entered into the database, the system comprising:

a first database implemented on one or more computer readable storage memory, wherein the first database comprises one or more database tables, columns and rows;

a first schema stored on one or more computer readable storage memory, the first schema defining a first set of constraints on data entered into the one or more tables, columns and rows in the first database, wherein at least some of the constraints are specified for a particular table, column or row and wherein the first set of constraints requires that a first field of the first database can only accept a data value which is one of a particular set of data types;

a second database implemented in main memory and/or on one or more computer readable storage memory, wherein the second database comprises one or more database tables, columns and rows including at least one database column, table or row corresponding to each of one or more of the one or more database tables columns and rows in the first database;

a second schema stored in main memory and/or on one or more computer readable storage memory, the second schema defining a second set of constraints on data entered into the one or more tables, columns and rows in the second database, and wherein the second set of constraints includes zero or more constraints on a first database table column or row in the second database that are less strict than a constraint from the first set of constraints on a database column or row in the first database to which the first database table column or row corresponds and wherein the second set of constraints allows a second field of the second database corresponding to the first field of the first database to accept a data value of a data type which is not among the particular set of data types required by the field of the first database and allows the second field of the second database corresponding to the first field of the first database to accept a data value of a data type which is among the particular set of data types required by the field of the first database.

17. The system of claim 16, further comprising a module configured to:
  import data from the first database;
  store the data from the first database in fields in the second database corresponding to fields in the first database.

18. The system of claim 16, further comprising a module configured to:
  determine that the user input received for the second database does not comply with the first set of constraints for the first schema for the first database; and
  in response to determining that the user input for the second database does not comply with the first set of constraints for the first schema for the first database, surface to the user that the user input for the second database does not comply with the first set of constraints for the first schema for the first data base.

19. The system of claim 16, further comprising a module configured to merge data from the second database into the first database.

* * * * *